May 30, 1967 G. J. YOUNG 3,322,576
PLURAL COATED FUEL CELLS ELECTRODE AND ELECTRO-PLATING
METHOD FOR MAKING SAME
Filed Oct. 28, 1963

INVENTOR.
GEORGE J. YOUNG
BY
Carlsen, Carlsen & Sturm
ATTORNEYS

United States Patent Office 3,322,576
Patented May 30, 1967

3,322,576
PLURAL COATED FUEL CELLS ELECTRODE AND ELECTROPLATING METHOD FOR MAKING SAME
George J. Young, Trucksville, Pa., assignor to Studebaker Corporation, South Bend, Ind., a corporation of Michigan
Filed Oct. 28, 1963, Ser. No. 319,396
5 Claims. (Cl. 136—121)

The present invention is broadly directed to fuel cells and is more particularly directed to improved electrodes for such cells.

The concepts involved in fuel cells using externally supplied fuel have been known for many years. The present invention is directed to such fuel cell wherein the electrodes proper are not consumed in operation. While the present invention will find application in a variety of types of fuel cells, it will be described with particularity in conjunction with an acid electrolyte-hydrocarbon and oxygen type cell. While other electrolytes and in particular other fuels may be used with the improved electrode of the present invention, the invention will be described with regard to a propane-air fuel cell wherein phosphoric acid is used as the electrolyte and which operates in the range of 150 to 200° C. Electrodes for use in this type of fuel cell desirably have the following properties.

(1) Good electrical conductivity
(2) Hydrophobic to prevent "drowning"
(3) Inert chemically and structurally strong to maintain stability
(4) Good diffusion capability to allow reactants to migrate into the reaction area and to allow the by-products to migrate out
(5) Good support for the catalyst
(6) Low in cost Many prior art electrodes have made use of carbon having a catalyst such as platinum either dispersed through the body of the carbon or applied as a coating to the surface thereof. While these electrodes meet some of the above enumerated goals they do not provide the combination of all these goals; especially when used at high temperature and in strongly acid electrolytes.

Accordingly, it is an object of the present invention to provide a highly efficient electrode for a fuel cell;

More particularly, it is an object of the present invention to provide an electrode and method of making same for use in a gaseous hydrocarbon-air type fuel cell using an acid electrolyte at elevated temperatures;

Other and further objects will be apparent from the following specification and drawings wherein.

Figure 1:
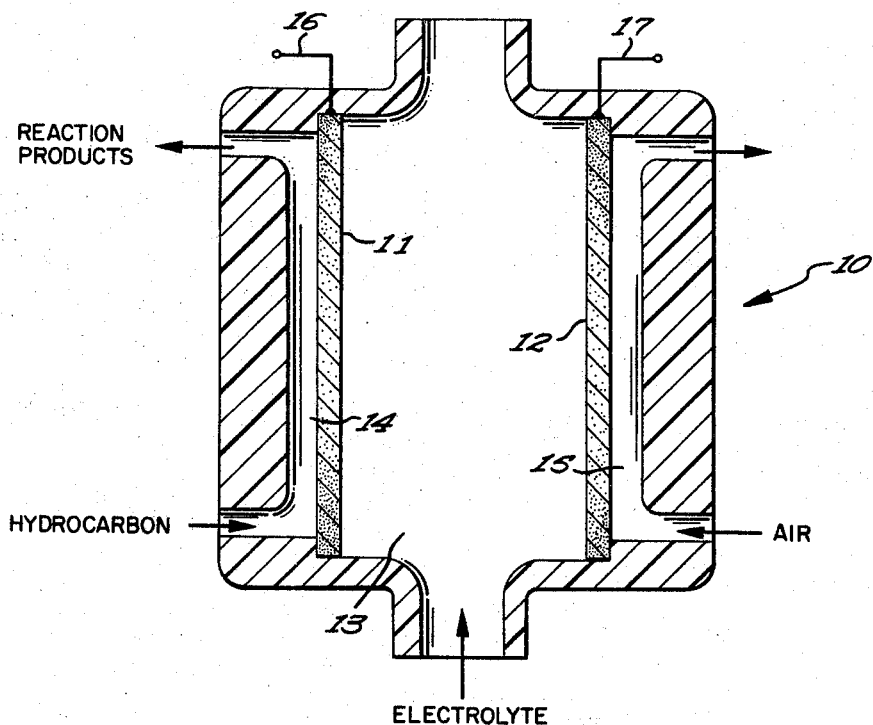
FIGURE 1 is a schematic illustration of a fuel cell of the hydrocarbon-air type.

Referring now to FIGURE 1 there is shown a fuel cell 10 having a fuel electrode 11 and oxygen or air electrode 12 mounted so as to provide an electrolyte chamber 13 therebetween.

Fuel chamber 14 and oxygen chamber 15 are provided for the fuel electrode and oxygen electrode respectively. Also shown are fuel and air inlets and waste product outlets. Leads 16 and 17 are electrically connected to the electrodes. Operation of such a cell is well known and will not be described further herein.

Figure 2:
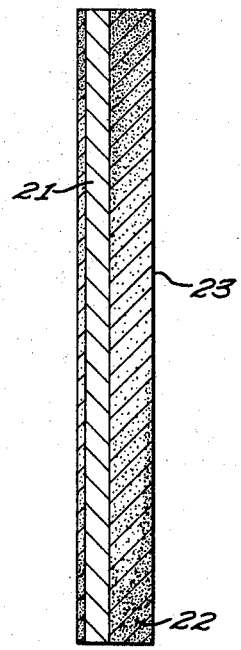
FIGURE 2 is a sectioned view of a fuel cell electrode in accordance with the preferred form of the invention.

In FIGURE 2 there is illustrated the preferred form of the improved electrode of the present invention. The electrode comprises a supporting metal screen or grid 21 of an inert metal such as tantalum or titanium (or other chemically resistant metal) which acts as a low resistance current collector and as a support for the balance of the material of the electrode. 22 designates a carbon-binder and wetproofing material coating both surfaces of the metal screen 21. On the electrolyte facing surface 23 of the carbon film 22 is deposited a catalyst. Preparation of the electrode will now be described in further detail for the preferred form of the invention.

Metal support

The metal member 21 may be in a variety of forms. It may be a fine mesh screen or expanded metal sheet. I have found that a 100 mesh screen is satisfactory with wire of about .005 inch diameter. As already noted the wire may be of tantalum, titanium, or any metal resistant to the electrolyte used in the fuel cell. This screen is provided with a lead means for power take off and functions as both a support and as a low electrical resistance current collector.

Carbon coating

Preparation of the carbon base coating for the metal support is as follows. The carbon may be in amorphous form, although I have found that carbon in graphite form is superior from the point of view of deterioration in operation of the fuel cell. Block graphite is a satisfactory starting material.

The graphite is ground to a powder of 20 to 100 mesh typical size and is then mixed with a dispersing agent and further reduced by ball milling to −325 mesh. The choice of dispersing agent will depend to some degree on the binding agent to be used with the graphite. I have found that Tergitol is a suitable dispersing agent. A small quantity—about 0.1 part by weight—is satisfactory.

The binding agent to be used with the graphite is preferably Teflon, although certain analogous materials may be used. Teflon is a polytetrafluoroethylene plastic. Other analogous materials such as fluorinated ethylene propylene or polychlorotrifluoroethylene may be used. These binder agents all in addition to possessing binder properties, share the important property of being highly resistant chemically, capable of sustained exposure to temperatures at the preferred operating temperature of the fuel cell, and are all highly hydrophobic in nature. This latter property is very important as it is necessary to prevent "drowning" of the cell. The binder material should be in finely powdered form.

80 to 90 parts by weight of the slurry resulting from the graphite milling is admixed with 10 to 20 parts by weight of the binder and put through a colloid mill until the product is −225 mesh wet screen or smaller.

The graphite-binder mixture is then coated onto the metal screen support by brushing, spraying, or wire-rod techniques to produce a film of from 1–3 mils finished thickness. When the metal screen member is used as the support some of the graphite-binder will penetrate to coat both sides of the screen as shown in FIGURE 2. This proves advantageous as it provides a locking action to aid in holding the graphite-binder mixture firmly to the metal support.

The coating is allowed to air dry and is then heated to a temperature of from 130° to 200° C. to allow the binder to undergo some plastic flow. Excessive heating is to be avoided as flow may be excessive tending to lower the desired porosity of the finished product. When Teflon is used as the binder I have found that a bake of one hour at 150° C. is satisfactory.

The catalyst

The catalyst to be used with the electrode may be any of those catalysts well known to those skilled in the art. However, I have found that catalysts of finely divided metal of the platinum group are most satisfactory. Platinum metal is the preferred material. Several methods may be used to coat the graphite surface with finely divided platinum.

Reduction of salts of platinum such as platinum chloride with potassium borohydride or chloroplatinic acid with hydrogen may be used. In these techniques the surface of the graphite which is to face the electrolyte is coated with a solution of the platinum compound and then treated with the reducing agent.

Although such techniques are operable I have found that a markedly superior product results if the platinum is electroplated onto the surface of the graphite by the following procedure. It will be appreciated that by use of masking techniques the plating may be limited to that surface which is to face the electrolyte. This is desirable in order to minimize the cost of the electrode. It is, of course, not harmful to coat both surfaces.

The plating procedure used is as follows. A plating bath of chloroplatinic acid of the type well known in the art is prepared and the graphite coated electrode is immersed in the solution as a cathode. A platinum rod may be used as the anode. Current is passed through the solution for a short period (one minute is satisfactory) at a current density of from 5–50 ma./cm.$^2$. The time is not particularly important except as it affects the cost due to the amount of platinum plated. This initial "strike" is firmly adhered to the graphite substrate and acts as nucleation sites for the subsequent deposition of the platinum black.

After the initial high current density deposition the current is decreased to from 0.02 to 0.05 ma./cm.$^2$ and plating is continued until from 0.1 to 20 mg./cm.$^2$ of platinum black is deposited on the electrode.

Amounts less than 0.1 mg./cm.$^2$ provide inadequate catalytic action, while amounts in excess of 20 mg./cm.$^2$ produce no beneficial results. The preferred range is from 2–4 mg./cm.$^2$.

Following the platinum deposition the electrode is again heated at from 130° to 200° C. for about one hour to further bond the platinum deposit to the surface. A variation of the above procedure may also be used wherein a laminar structure results. In this procedure thin layers of the graphite-binder material are alternated with platinum deposits. Slightly increased efficiency results from such a structure, although cost per unit area of the electrode is somewhat higher.

I claim:
1. An electrode for a fuel cell comprising
   (a) a porous metal support member in sheet form of a metal selected from the group consisting of tantalum and titanium,
   (b) a first coating for said support including graphite and a highly fluorinated polymer binder, said graphite being present in from 80 to 90 parts by weight and said binder being present in from 10 to 20 parts by weight,
   (c) a second coating on at least one surface of said first coating of platinum black in a quantity of from 0.1 to 20 mg./cm.$^2$.
2. An electrode for a fuel cell in accordance with claim 1 wherein said first coating is from 1 to 3 mils in thickness.
3. An electrode for a fuel cell comprising
   (a) a porous metal support member in sheet form selected from the group consisting of tantalum and titanium,
   (b) a first coating for said support including graphite and polytetrafluoroethylene binder, said graphite being present in from 80 to 90 parts by weight and said binder being present in from 10 to 20 parts by weight,
   (c) a second coating on at least one surface of said first coating of platinum black in a quantity of from 0.1 to 20 mg./cm.$^2$.
4. An electrode in accordance with claim 3 wherein the platinum black is present in an amount equal to from 2 up to about 4 mg./cm.$^2$ of electrode surface.
5. The method of forming an electrode for a fuel cell comprising
   (a) forming a mixture of finely divided graphite and a highly fluorinated polymer binder wherein said graphite is present in from 80 to 90 parts by weight and said binder is present in from 10 to 20 parts by weight,
   (b) coating a porous metal sheet with a film of said mixture,
   (c) baking said coating at a temperature of from 130° to 200° C.,
   (d) electrolytically depositing a layer of metal of the platinum group on said coating in an amount of from 0.1 to 20 mg./cm.$^2$ by first depositing a "strike" at a current density of from 5 to 50 ma./cm.$^2$ and then plating at a current density of from 0.02 to 0.05 ma./cm.$^2$
   (e) baking the assembly at a temperature of from 130° to 200° C. for about one hour.

References Cited
UNITED STATES PATENTS

| | | | |
|---|---|---|---|
| 2,782,180 | 2/1957 | Weidman. | |
| 3,077,507 | 2/1963 | Kordesch et al. | 136—86 |
| 3,222,224 | 12/1965 | Williams et al. | 136—86 |
| 3,236,693 | 2/1966 | Caesar | 136—86 |

WINSTON A. DOUGLAS, *Primary Examiner.*

ALLEN B. CURTIS, *Examiner.*